United States Patent

Babcock et al.

[11] Patent Number: 5,168,106
[45] Date of Patent: Dec. 1, 1992

[54] CARBON BLACKS

[75] Inventors: Kenneth W. Babcock, Pampa, Tex.; Jay J. Zimmer, Brighton, Australia

[73] Assignee: Cabot Corporation, Waltham, Mass.

[21] Appl. No.: 406,993

[22] Filed: Sep. 14, 1989

[51] Int. Cl.$^5$ .......................... C01B 31/00; C08K 3/04
[52] U.S. Cl. ..................................... 524/495; 423/445
[58] Field of Search ................. 423/445, 451; 524/495

[56] References Cited

U.S. PATENT DOCUMENTS

| | | | |
|---|---|---|---|
| 4,748,199 | 5/1988 | Takiguchi et al. | 524/495 |
| 4,775,778 | 10/1988 | van Konynenburg et al. | 524/495 |
| 4,871,794 | 10/1989 | Itoh et al. | 524/495 |
| 4,886,850 | 12/1989 | Ogawa et al. | 524/495 |

FOREIGN PATENT DOCUMENTS 61-034072 2/1986 Japan ................................... 423/445

Primary Examiner—Michael Lewis
Assistant Examiner—Stuart L. Hendrickson
Attorney, Agent, or Firm—L. A. Chaletsky; H. J. Gwinnell

[57] ABSTRACT

Carbon blacks having a nitrogen surface area ($N_2$ SA) of from at least 180 m$^2$/g to about 250 m$^2$/g, a ratio of nitrogen surface area/iodine adsorption number ($N_2$ SA/$I_2$ No.) of from about 0.90 to about 1.05, a ratio of $\Delta D$ 50/Dmode of from about 0.67 to about 0.81, a DBP (dibutyl phthalate number) of from about 115 cc/100 g to about 135 cc/100 g and a $\Delta$DBP [$\Delta$DBP=DBP−CDPB (Crushed DBP)] less than or equal to 20 cc/100 g, and rubber compositions in which the carbon blacks are incorporated.

20 Claims, 2 Drawing Sheets

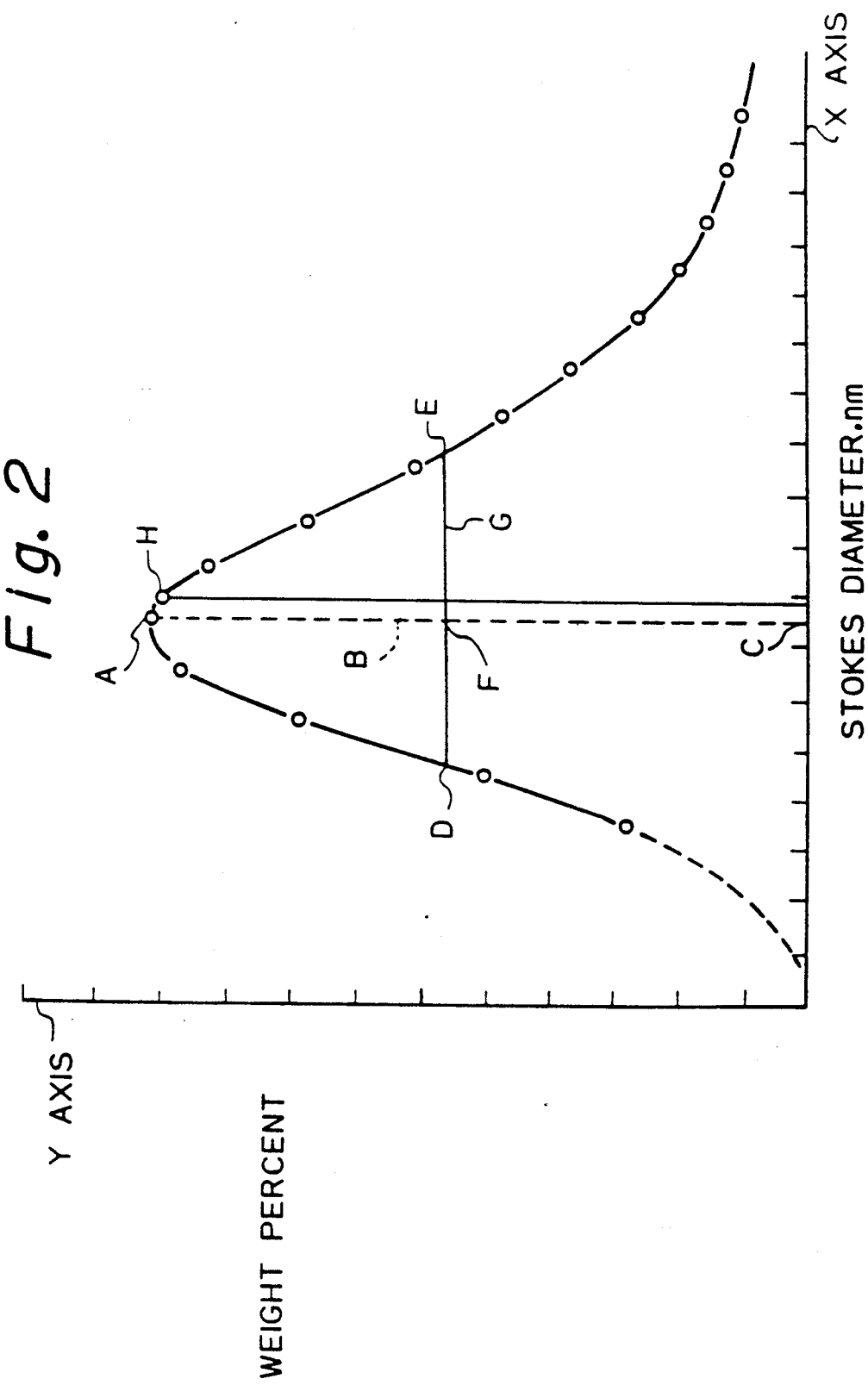

CARBON BLACKS

FIELD OF THE INVENTION

The present invention relates to a class of new and novel furnace carbon blacks which are suitable for various applications and particularly well suited for use in rubber compositions.

BACKGROUND

Carbon blacks are generally produced in a furnace-type reactor by pyrolyzing a hydrocarbon feedstock with hot combustion gases to produce combustion products containing particulate carbon black.

Carbon blacks may be utilized as pigments, fillers, reinforcing agents and for a variety of other applications. For example, carbon blacks are widely utilized as fillers and reinforcing pigments in the compounding and preparation of rubber compositions. Most importantly, carbon blacks are effective in the preparation of rubber vulcanizates intended for usage in preparing tires. It is generally desirable in the production of tires to utilize carbon blacks which produce tires with satisfactory handling and cornering properties, abrasion resistance, and traction (wet and dry skid resistance). In particular, it is desirable to produce blacks capable of imparting improved properties of these types for use in high performance tires and racing tires.

Accordingly, one object of the present invention is the production of new carbon blacks which impart improved handling and cornering, increased abrasion resistance and improved traction properties to natural rubbers, synthetic rubbers and blends of natural and synthetic rubbers incorporating the carbon blacks.

Another object of the present invention is new rubber compositions, advantageous for use as high performance and racing tires, incorporating the new carbon blacks.

Other objects of the present invention will become apparent from the following description and the claims.

SUMMARY OF THE INVENTION

We have discovered a new class of carbon blacks having a nitrogen surface area ($N_2SA$) of at least 180 $m^2/g$ (square meters per gram) to about 250 $m^2/g$, preferably of from about 190 $m^2/g$ to about 240 $m^2/g$, a ratio of nitrogen surface area/iodine Adsorption number ($N_2SA/I_2$ No.) of from about 0.90 to about 1.05, a ratio of $\Delta D\,50/D\text{mode}$ of from about 0.67 to about 0.81, preferably of from about 0.70 to about 0.77, a DBP (dibutyl phthlate number) of from about 115 cc/100 g (cubic centimeters per 100 grams) to about 135 cc/100 g and a $\Delta DBP$ [$\Delta DBP = DBP - CDBP$ (Crushed DBP)] less than or equal to 20 cc/100 g, preferably from about 10 cc/100 g to about 20 cc/100 g. We have also discovered a new class of rubber compositions containing these carbon blacks.

The carbon blacks of the present invention may be produced in a furnace carbon black reactor having a first (combustion) zone, and a reaction zone separated by at least two zones, hereinafter referred to as feedstock injection zones, into which a carbon black yielding feedstock is injected in any manner known to the art, into a hot combustion gas stream. The resultant mixture of hot combustion gases and feedstock passes into the reaction zone. Pyrolysis, of the carbon black yielding feedstock, is stopped by quenching the mixture when the carbon blacks of the present invention have been formed. Preferably pyrolysis is stopped by a quench injecting a quenching fluid. The process for preparing the novel carbon blacks of the present invention will be described in greater detail hereinafter.

The rubbers for which the novel carbon blacks of this invention are effective as reinforcing agents include natural and synthetic rubbers. Generally, amounts of the carbon black product ranging from about 10 to about 250 parts by weight can be used for each 100 parts by weight of rubber in order to impart a significant degree of reinforcement thereto. It is, however, preferred to use amounts varying from about 20 to about 100 parts by weight of carbon black per 100 parts by weight of rubber and especially preferred is the utilization of from about 40 to about 80 parts of carbon black per 100 parts of rubber.

Among the rubbers suitable for use with the present invention are natural rubber and its derivatives such as chlorinated rubber; copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl-2-vinylpyridine, 5-ethyl-2-vinylpyridine, 2-methyl-5-vinylpyridine, alkyl-substituted acrylates, vinyl ketone, methyl isopropenyl ketone, methyl vinyl ether, alphamethylene carboxylic acids and the esters and amides thereof such as acrylic acid and dialkylacrylic acid amide; also suitable for use herein are copolymers of ethylene and other high alpha olefins such as propylene, butene-1 and penetene-1; particularly preferred are the ethylene-propylene copolymers wherein the ethylene content ranges from 20 to 90 percent by weight and also the ethylene-propylene polymers which additionally contain a third monomer such as dicyclopentadiene, 1,4-hexadiene and methylene norbornene.

An advantage of the carbon blacks of the present invention is that the carbon blacks impart improved handling and cornering properties, increased abrasion resistance and improved traction to compositions containing natural rubbers, synthetic rubbers or blends thereof in which the carbon blacks of the present invention are incorporated.

An advantage of the rubber compositions of the present invention is the that the rubber compositions are particularly well suited for use as high performance and racing tires.

Other advantages of the present invention will become apparent from the following more detailed description of the invention.

BRIEF DESCRIPTION OF THE DRAWINGS

FIG. 2 is a graph with an example of a Stokes diameter distribution curve.

DETAILED DESCRIPTION OF THE INVENTION

Figure 1:
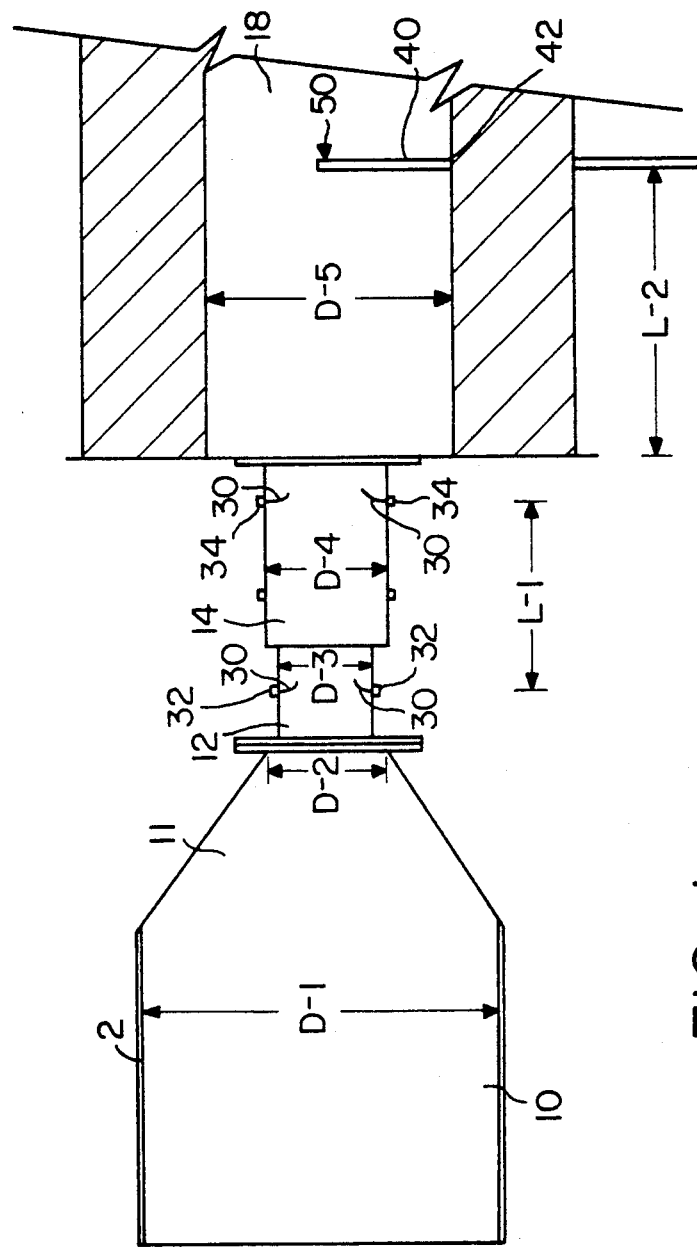
FIG. 1 is a cross-sectional view of a portion of one type of furnace carbon black reactor which may be utilized to produce the carbon blacks of the present invention.

The carbon blacks of the present invention are characterized by having a $N_2SA$ of at least 180 $m^2/g$ to about 250 $m^2/g$, preferably of from about 190 $m^2/g$ to about 240 $m^2/g$, a $N_2SA/I_2$ No. ratio of from about 0.90 to about 1.05, a ratio of $\Delta D50/Dmode$ of from about 0.67 to about 0.81, preferably of from about 0.70 to about 0.77, a DBP of from about 115 cc/100 g to about 135 cc/100 g and a $\Delta DBP$ less than or equal to 20 cc/100 g, preferably from about 10 cc/100 g to about 20 cc/100 g.

The carbon blacks of the present invention may be produced in a modular, also referred to as "staged", furnace carbon black reactor. section of a typical modular furnace carbon black reactor which may be utilized to produce the carbon blacks of the present invention is depicted in FIG. 1.

Referring to FIG. 1, the carbon blacks of the present invention may be produced in a furnace carbon black reactor 2, having a combustion zone 10, which has a zone of converging diameter 11; feedstock injection zones 12 and 14; and reaction zone 18. The diameter of the combustion zone, 10, up to the point where the zone of converging diameter, 11, begins is shown as D-1; the diameter of the converging zone, at the narrowest point, is shown as D-2; the diameter of zone 12, as D-3; the diameter of zone 14, as D-4; and the diameter of the reaction zone, 18, as D-5. The carbon blacks of the examples described herein of the present invention were produced in a reactor where D-1 is 20 inches; D-2 is 5.5 inches; D-3 is 4.5 inches; D-4 is 5.3 inches; and D-5 is 13.5 inches.

To produce the carbon blacks of the present invention hot combustion gases are generated in combustion zone 10 by contacting a liquid or gaseous fuel with a suitable oxidant stream such as air, oxygen, mixtures of air and oxygen or the like. Among the fuels suitable for use in contacting the oxidant stream in combustion zone, 10, to generate the hot combustion gases are included any of the readily combustible gas, vapor or liquid streams such as natural gas, hydrogen, carbon monoxide, methane, acetylene, alcohols, or kerosene. It is generally preferred, however, to utilize fuels having a high content of carbon-containing components and in particular, hydrocarbons. The ratio of air to fuel utilized to produce the carbon blacks of the present invention may be from about 10:1 to about 20:1. To facilitate the generation of hot combustion gases, the oxidant stream may be preheated.

The hot combustion gas stream flows downstream from zones 10 and 11 into zones 12, 14 and then 18. The direction of the flow of hot combustion gases is shown in the figure by the arrow. Carbon black-yielding feedstock, 30, is introduced at point 32 (located in zone 12) and at point 34 (located in zone 14). To produce the carbon blacks of the present invention, the feedstock may be injected in an amount of from about 50% to about 80%, by weight, at point 32, and the remainder of the total amount of from about 20% to about 50%, by weight, injected at point 34. Preferably from about 70% to about 80% of the total amount of feedstock, by weight, is introduced at point 32, and the remainder of the total amount of feedstock, from about 30% to about 20%, by weight, is introduced at point 34. In the examples described herein carbon black-yielding feedstock, 30, was injected substantially transversely from the periphery of the stream of hot combustion gases in the form of a plurality of jets which penetrate into the interior regions of the hot combustion gas stream to insure a high rate of mixing and shearing of the hot combustion gases and the carbon black-yielding feedstock so as to rapidly and completely decompose and convert the feedstock to the novel carbon blacks of the present invention. The distance between point 32 and point 34 is shown in the figure as L-1. The carbon blacks of the examples described herein of present invention were produced in a carbon black reactor where L-1 is 18 inches.

The mixture of carbon black-yielding feedstock and hot combustion gases flows downstream through zones 12 and 14, into reaction zone 18. Quench 40, located at point 42, injecting quenching fluid 50, is utilized to stop pyrolysis of the carbon black-yielding feedstock when the novel carbon blacks of the present invention are formed. Point 42 may be determined in any manner known to the art, for selecting the position of a quench to stop pyrolysis. One method for determining the position of the quench to stop pyrolysis is by determining the point at which an acceptable toluene extract level for the novel carbon blacks of the present invention is achieved. Toluene extract level may be measured by using ASTM Test D1618-83 "Carbon Black Extractables—Toluene Discoloration". L-2 is the distance from the beginning of zone 18 to quench point 42, and will vary according to the position of the quench.

After the mixture of hot combustion gases and carbon black-yielding feedstock is quenched, the cooled gases pass downstream into any conventional cooling and separating means whereby the carbon blacks are recovered. The separation of the carbon black from the gas stream is readily accomplished by conventional means such as a precipitator, cyclone separator or bag filter.

The following testing procedures are used in the determination and evaluation of the analytical properties of the carbon blacks of the present invention, and the physical properties of the rubber compositions incorporating the carbon blacks of the present invention.

Nitrogen surface area of the carbon blacks ($N_2$ SA) was determined according to ASTM D3037 Method A. Iodine adsorption number of the carbon blacks ($I_2$ No.) was determined according to JIS K 6221. Tinting strength (Tint) of the carbon blacks was determined according to ASTM Test Procedure D3265-85a. The DBP (Dibutyl Phthalate) of the carbon black pellets was determined according to the procedure set forth in JIS K 6221 Method A. The CDBP (Crushed Dibutyl Phthalate) of the carbon black pellets was determined by crushing the carbon black pellets according to the procedure set forth in ASTM D 3493 and then determining DBP according to JIS K 6221 Method A.

$\Delta D$ 50 of the carbon blacks was determined in the following manner. A histogram is made of the Stokes diameter of the aggregates of the carbon black sample versus the relative frequency of their occurrence in a given sample. As shown in FIG. 2, a line (B) is drawn from the peak (A) of the histogram in a direction parallel to the Y axis, to and ending at the X-axis at point (C) of the histogram. The midpoint (F) of the resultant line (B) is determined and a line (G) is drawn through the midpoint (F) thereof parallel to the X-axis. Line (G) intersects the distribution curve of the histogram at two points D and E. The absolute value of the difference of the two Stokes diameters of the carbon black particles at points D and E is the D 50 value. The data used to generate the histogram are determined by the use of a disk centrifuge such as the one manufactured by Joyce Loebl Co. Ltd. of Tyne and Wear, United Kingdom. The following procedure is a modification of the procedure described in the instruction manual of the Joyce Loebl disk centrifuge file reference DCF 4.008 published on Feb. 1, 1985,the teachings of which are hereby incorporated by reference, and was used in determining the data.

The procedure is as follows. 10 mg (milligrams) of a carbon black sample are weighed in a weighing vessel, then added to 50 cc of a solution of 10% absolute ethanol and 90% distilled water which is made 0.05% NONIDET P-40 surfactant (NONIDET P-40 is a registered trademark for a surfactant manufactured and sold by Shell Chemical Co.). The resulting suspension is dispersed by means of ultrasonic energy for 15 minutes using Sonifier Model No. W 385, manufactured and sold by Heat Systems Ultrasonics Inc., Farmingdale, New York.

Prior to the disk centrifuge run the following data are entered into the computer which records the data from the disk centrifuge:

1. The specific gravity of carbon black, taken as 1.86 g/cc;
2. The volume of the solution of the carbon black dispersed in a solution of water and ethanol, which in this instance is 0.5 cc.;
3. The volume of spin fluid, which in this instance is 10 cc of water;
4. The viscosity of the spin fluid, which in this instance is taken as 0.933 centipoise at 23 degrees C.;
5. The density of the spin fluid, which in this instance is 0.9975 g/cc at 23 degrees C.;
6. The disk speed, which in this instance is 8000 rpm;
7. The data sampling interval, which in this instance is 1 second.

The disk centrifuge is operated at 8000 rpm while the stroboscope is operating. 10 cc of distilled water are injected into the spinning disk as the spin fluid. The turbidity level is set to 0; and 1 cc of the solution of 10% absolute ethanol and 90% distilled water is injected as a buffer liquid. The cut and boost buttons of the disk centrifuge are then operated to produce a smooth concentration gradient between the spin fluid and the buffer liquid and the gradient is monitored visually. When the gradient becomes smooth such that there is no distinguishable boundary between the two fluids, 0.5 cc of the dispersed carbon black in aqueous ethanol solution is injected into the spinning disk and data collection is started immediately. If streaming occurs the run is aborted. The disk is spun for 20 minutes following the injection of the dispersed carbon black in aqueous ethanol solution. Following the 20 minutes of spinning, the disk is stopped, the temperature of the spin fluid is measured, and the average of the temperature of the spin fluid measured at the beginning of the run and the temperature of the spin fluid measured at the end of the run is entered into the computer which records the data from the disk centrifuge. The data is analyzed according to the standard Stokes equation and is presented using the following definitions:

Carbon black aggregate—a discrete, rigid colloidal entity that is the smallest dispersible unit; it is composed of extensively coalesced particles;

Stokes diameter—the diameter of a sphere which sediments in a viscous medium in a centrifugal or gravitational field according to the Stokes equation. A non-spherical object, such as a carbon black aggregate, may also be represented in terms of the Stokes diameter if it is considered as behaving as a smooth, rigid sphere of the same density and rate of sedimentation as the non-spherical object. The customary units are expressed in nanometer diameters.

Mode (Dmode for reporting purposes)—The Stokes diameter at the point of the peak (Point A of FIG. 2 herein) of the distribution curve of Stokes diameter.

Median Stokes diameter—(Dst for reporting purposes) the point on the distribution curve of Stokes diameter where 50% by weight of the sample is either larger or smaller (Point H of FIG. 2 herein). It therefore represents the median value of the determination.

Rubber compositions incorporating the novel carbon blacks of the present invention were prepared according to the SBR recipe shown in ASTM D 3191-83.

The cure characteristics of the rubber compositions were measured using a Moving Die Rheometer (MDR). The cure temperature was set at 293 degrees F. To test a sample, a 6 gram sample of the uncured rubber composition was sealed within a cavity formed by the upper and lower dies of the MDR. The bottom die was driven at 100 cycles/min. through 1 arc degree. The resultant force transferred through the sample to the upper die is measured by a reaction torque transducer. $\tau$min is the minimum torque value recorded during a test. $\tau$max is the maximum torque value recorded during a test. $\Delta\tau$ is the difference between $\tau$max and $\tau$min and represents the amount of crosslinking density generated during a test. $T_2$ is the time for a 2 inch-pound rise in the torque value during a test. $T_{90}$ is the time for a 90% increase in the cure state to take place during a test.

The abrasion data of the rubber compositions were determined using an abrader which is based on a Lambourn type machine. Abrasion rates (cubic centimeter/centimeter travel) were measured at 7%, 13% and 21% slip. The slip is based on the relative velocity of the plates rather than angle of slip. In the following examples, the abrasion index is the ratio of the abrasion rate of a control composition containing VULCAN 9 carbon black, a trademarked product of Cabot Corporation, Waltham, Massachusetts divided by the abrasion rate of a composition produced using a specified carbon black of the present invention, at the same slip.

The hardness of the rubber compositions was measured by the procedure set forth in ASTM D 2240. The modulus, tensile and elongation of the rubber compositions were measured by the procedure set forth in ASTM D 412.

The dynamic mechanical properties of the rubber compositions were determined in a manner well known to those of ordinary skill in the art, using an Instron Model 1350 Servohydraulic System interfacing with a Digital Equipment Corporation Minc-23 computer for data manipulation. The specimen tested for each of the rubber compositions consisted of a sandwich type test specimen comprising four pieces of each rubber composition, each piece having the dimensions 30 mm by 30 mm by 6 mm thick. The dynamic mechanical properties measured were complex modulus (G*), elastic modulus (G'), and loss modulus (G"). Since the viscoelastic properties of carbon black reinforced rubber compositions are temperature, frequency and strain dependent, the measurements were done at two temperatures, 70 degrees C. and 0.0 degrees C., 1 Hertz, and three strains, 5%, 10% and 20%.

The loss tangent (tan delta) of a test piece, 30 mm by 5 mm by 2 mm thick, of each of the SBR compositions was determined by measurement in a visco-elastic spectrometer VES-S type made by Iwamoto Seisakusho Co., at a temperature of 70 degrees C., a frequency of 10 Hz and a deformation of 2%.

The effectiveness and advantages of the present invention will be further illustrated by the following examples.

EXAMPLES 1-3

Three examples of the novel carbon blacks of the present invention were prepared in three different carbon black production runs, in a reactor generally described herein, and as depicted in FIG. 1, utilizing the reactor conditions and geometry set forth in Table I. The fuel utilized in the combustion reaction in each example was natural gas, having a methane content of 84.58 mol. % and a wet heating value of 973 BTU/SCF at standard conditions (14.65 psia, 60° F.). The liquid feedstock utilized in each example was Conoco LC oil which had the following properties:

| Feedstock Properties | |
|---|---|
| Hydrogen/Carbon Ratio | 0.94 |
| Hydrogen (wt. %) | 7.34 |
| Carbon (wt. %) | 92.5 |
| Sulfur (wt. %) | 0.5 |
| A.P.I. Gravity 15.5/15.6 C(60)F [ASTM D-287] | −1.9 |
| Specific Gravity 15.5/15.6 C(60)F [ASTM D-287] | 1.092 |
| Viscosity, SUS (130° F.) [ASTM D-88] | 94.2 |
| Viscosity, SUS (210° F.) [ASTM D-88] | 39.3 |
| BMCI (Visc-Grav) | 136 |

TABLE I

| | CARBON BLACKS | | |
|---|---|---|---|
| | Example 1 | Example 2 | Example 3 |
| D-1, in. | 20 | 20 | 20 |
| D-2, in. | 5.5 | 5.5 | 5.5 |
| D-3, in. | 4.5 | 4.5 | 4.5 |
| D-4, in. | 5.3 | 5.3 | 5.3 |
| D-5, in. | 13.5 | 13.5 | 13.5 |
| L-1, in. | 18 | 18 | 18 |
| L-2, ft. | 4.5 | 7.5 | 7.5 |
| Oil Inj. Pt. 32,) Tips # × Size, in.) | 3 × 0.020 & 3 × 0.025 | 3 × 0.020 & 3 × 0.025 | 3 × 0.020 & 3 × 0.025 |
| Oil Rate Pt. 32, gph | 67 | 67 | 72 |
| Oil Press. Pt. 32, psig | 218 | 225 | 260 |
| Oil Preheat Pt. 32, °F. | 310 | 305 | 310 |
| Oil Inj. Pt. 34,) Tips # × Size, in.) | 3 × 0.020 | 3 × 0.020 | 3 × 0.020 |
| Oil Rate Pt. 34, gph | 22 | 23 | 23 |
| Oil Press. Pt. 34, psig | 104 | 130 | 130 |
| Oil Preheat Pt. 34, °F. | 250 | 240 | 240 |
| Comb. Air, kscfh | 80.0 | 80.0 | 80.0 |
| Comb. Air Preheat, °F. | 970 | 975 | 970 |
| Natural Gas, kscfh | 6.15 | 6.15 | 6.15 |
| Air to Burn Ratio | 9.1 | 9.1 | 9.1 |
| Potassium, lb./hr. | 5.5 | 20.0 | 26.0 |
| Quench Press., psi | 60 | 57 | 55 |
| Temp. at Quench, °F. | 1350 | 1350 | 1350 |

Inj. = Injection
Comb. = combustion
Press. = pressure
Pt. 32 = Point 32 on FIG. 1
Pt. 34 = Point 34 on FIG. 1
gph = gallons per hour
psi = pounds per square inch
kscfh = standard cubic feet per hour, in thousands
in. = inches
ft. = feet
°F. = degrees Fahrenheit The carbon blacks produced in each run were then analyzed according to the procedures described herein. The analytical properties of the blacks produced in each run, as well as those of an SAF type carbon black control sample, were as follows:

| | Carbon Black | | | |
|---|---|---|---|---|
| | Example 1 | Example 2 | Example 3 | SAF |
| ΔD 50 (nm) | 48 | 45 | 45 | 61 |
| Dmode (nm) | 64 | 60 | 62 | 80 |
| ΔD 50/Dmode | 0.75 | 0.75 | 0.73 | 0.76 |
| $N_2$ SA ($m^2/g$) | 216 | 236 | 192 | 144 |
| $I_2$ No. ($m^2/g$) | 215 | 236 | 200 | 146 |
| Tint (%) | 142 | 144 | 143 | 125 |
| DBP (cc/100 g) | 132 | 122 | 117 | 115 |
| CDBP (cc/100 g) | 112 | 106 | 102 | 96 |
| ΔDBP (cc/100 g) | 20 | 16 | 15 | 19 |
| $N_2$ SA/$I_2$ No. | 1.00 | 1.00 | 0.96 | 0.99 |

EXAMPLE 4

This Example illustrates the use of the novel carbon blacks of the present invention in rubber compositions. Four carbon blacks were evaluated in rubber compositions. Sample 1 was the carbon black of Example 1. Sample 2 was the carbon black of Example 2. Sample 3 was the carbon black of Example 3. Sample 4 was the control SAF (Super Abrasion Furnace) type carbon black.

Rubber compositions A, B, C and D were prepared incorporating each of the carbon black samples according to the ASTM-SBR procedure. The rubber compositions were as shown in Table II (all quantities shown as parts by weight):

TABLE II

| | Rubber Composition | | | |
|---|---|---|---|---|
| | A | B | C | D |
| SBR-1500 | 100 | 100 | 100 | 100 |
| Carbon Black of Example 1 | 50 | | | |
| Carbon Black of Example 2 | | 50 | | |
| Carbon Black of Example 3 | | | 50 | |
| SAF Type Carbon Black | | | | 50 |
| Zinc Oxide | 3 | 3 | 3 | 3 |
| Stearic Acid | 1 | 1 | 1 | 1 |
| TBBS* | 1 | 1 | 1 | 1 |
| Sulfur | 1.75 | 1.75 | 1.75 | 1.75 |

*TBBS = N-tert-butyl-2-benzothiazole sulfenamide

The loss tangent (tan delta) of each of the rubber compositions was then measured. The tan delta values of the rubber compositions were as follows:

| | Rubber Composition | | | |
|---|---|---|---|---|
| | A | B | C | D |
| tan delta | 0.246 | 0.263 | 0.241 | 0.201 |

These results clearly demonstrate that rubber compositions A, B and C, produced with the carbon blacks of the present invention have higher values for tan delta as compared to the control composition D, produced with the conventional SAF type carbon black. This, in turn, indicates that the rubber compositions of the present invention will have higher hysteresis resulting in improved traction in high performance and racing tires.

EXAMPLE 5

This Example illustrates that the effects resulting from the use of the novel carbon blacks of the present invention in rubber compositions are caused by the novel carbon blacks and not by any difference in the crosslinking density ($\Delta\tau$) of the rubber compositions. Utilizing the same carbon blacks of Examples 1, 2, and 3, and the same SAF type control black, four rubber compositions E, F, G and H were prepared according to the ASTM-SBR procedure except that the amount of TBBS was varied depending on the particular carbon black utilized. The rubber compositions were as shown in Table III (all quantities shown as parts by weight):

TABLE III

| | Rubber Composition | | | |
|---|---|---|---|---|
| | E | F | G | H |
| SBR-1500 | 100 | 100 | 100 | 100 |
| SAF Type Carbon Black | 50 | | | |
| Carbon Black of Example 1 | | 50 | | |
| Carbon Black of Example 2 | | | 50 | |
| Carbon Black of Example 3 | | | | 50 |
| Zinc Oxide | 3 | 3 | 3 | 3 |
| Stearic Acid | 1 | 1 | 1 | 1 |
| TBBS* | 1 | 1.04 | 1.08 | 1.04 |
| Sulfur | 1.75 | 1.75 | 1.75 | 1.75 |

*TBBS = N-tert-butyl-2-benzothiazole sulfenamide

As shown in Table III, the TBBS ingredient in each rubber composition, E, F, G, and H, was adjusted so that the crosslinking density ($\Delta\tau$) would be substantially similar for all the rubber compositions.

The static properties of the SBR compositions were then evaluated according to the ASTM procedures described herein. The results were as follows:

| Rubber Composition | Hardness | Modulus 100% El* (psi) | Modulus 300% El (psi) | Tensile (psi) | El$_b$* (%) |
|---|---|---|---|---|---|
| E | 65 | 470 | 2742 | 4053 | 394 |
| F | 69 | 498 | 2589 | 3976 | 417 |
| G | 70 | 415 | 2205 | 3392 | 406 |
| H | 70 | 483 | 2532 | 3285 | 358 |

*El = elongation; El$_b$ = elongation at break;
psi = pounds/square inch

These results show that the static properties of the rubber compositions F, G, and H produced with the carbon blacks of the present invention are comparable to those of rubber composition E, produced with an SAF type carbon black.

The cure characteristics of the rubber compositions, all of which were cured at 293° F. using MDR, were then evaluated according to the procedure described herein. The results were as follows:

| Rubber Composition | T min (lb-in.) | T max (lb-in.) | ΔT (lb-in.) | T$_2$ (min) | T$_{90}$ (min) |
|---|---|---|---|---|---|
| E | 10.7 | 49.4 | 38.7 | 12.16 | 37.46 |
| F | 14.7 | 54.5 | 39.8 | 12.04 | 41.4 |
| G | 13.9 | 53.4 | 39.5 | 12.05 | 40.71 |
| H | 12.6 | 52.6 | 40 | 12.64 | 41.98 | lb-in. = pound-inch; min = minutes

As will be understood by those of ordinary skill in the art, the $\Delta\tau$ values shown above indicate that the rubber compositions E, F, G, and H have comparable crosslinking densities.

The Laboratory Abrasion Index of each SBR composition was also evaluated as described herein. The results were as follows:

| Rubber Composition | 7% Slip (cc/cm trav) | 13% Slip (cc/cm trav) | 21% Slip (cc/cm trav) |
|---|---|---|---|
| E | 100 | 100 | 100 |
| F | 127 | 119 | 120 |
| G | 125 | 112 | 107 |
| H | 121 | 115 | 109 | cc/cm trav = cubic centimeters per centimeters travel

The laboratory abrasion index data show that the rubber compositions, F, G, and H, containing the carbon blacks of the present invention, exhibit significantly higher abrasion resistance than the rubber composition, E, containing the SAF type contol carbon black.

The dynamic mechanical properties of the SBR compositions were also evaluated at 1 Hertz, both at 0.0 degrees C., and 70 degrees C., as described herein and the results were as follows:

| Shear Strain→ | G* (MPa) 5% | G* (MPa) 10% | G* (MPa) 20% | G" (MPa) 5% | G" (MPa) 10% | G" (MPa) 20% |
|---|---|---|---|---|---|---|
| DYNAMIC MECHANICAL PROPERTIES 0° C., 1 Hz | | | | | | |
| E | 4.98 | 4.06 | 3.23 | 1.04 | 0.86 | 0.63 |
| F | 6.64 | 5.14 | 3.84 | 1.6 | 1.29 | 0.89 |
| G | 6.81 | 5.12 | 3.96 | 1.63 | 1.33 | 1.0 |
| H | 5.75 | 4.51 | 3.66 | 1.24 | 1.06 | 0.86 |
| DYNAMIC MECHANICAL PROPERTIES 70° C., 1 Hz | | | | | | |
| E | 2.58 | 2.32 | 1.99 | 0.32 | 0.26 | 0.19 |
| F | 3.03 | 2.57 | 2.10 | 0.48 | 0.37 | 0.25 |
| G | 2.92 | 2.49 | 2.16 | 0.49 | 0.38 | 0.29 |
| H | 2.91 | 2.51 | 2.19 | 0.46 | 0.35 | 0.28 |

MPa = megapascals

G*, the dynamic complex modulus, represents the cornering and handling stiffness of a rubber tire tread composition. High cornering and handling stiffness is important for high performance and racing tire treads. As shown by the above results, the G* values for the rubber compositions, F, G, and H, containing the carbon blacks of the present invention, are significantly higher than that of the rubber composition E, containing the control SAF type carbon black at various strain levels. Therefore the rubber compositions F, G, and H demonstrate improved cornering and handling stiffness as compared to rubber composition E.

Another very important property for high performance and racing tire tread compositions is traction. High energy dissipation is required for high traction. Loss modulus, G" is related to energy dissipation, with higher G" values being indicative of higher energy dissipation. As shown above, at 0.0 degrees C., the loss modulus, G", of the rubber compositions F, G, and H, produced with the carbon blacks of the present invention are significantly higher than the rubber composition, E, produced with the SAF carbon black sample. These results demonstrate that higher traction can be obtained by incorporating the carbon blacks of the present invention in rubber compositions.

It should be clearly understood that the forms of the present invention herein described are illustrative only and are not intended to limit the scope of the invention.

The present invention includes all modifications falling within the scope of the following claims.

We claim:

1. Carbon blacks characterized by having a nitrogen surface area of at least 180 m$^2$/g to about 250 m$^2$/g, a ratio of nitrogen surface area/iodine adsorption number of from about 0.90 to about 1.05, a ratio of $\Delta$D 50/Dmode of from about 0.67 to about 0.81, a DBP of from about 115 cc/100 g to about 135 cc/100 g and a $\Delta$DBP (DBP-CDBP) less than or equal to 20 cc/100 g.

2. The carbon blacks of claim 1 wherein the nitrogen surface area is from about 190 m$^2$/g to about 240 m$^2$/g.

3. The carbon blacks of claim 1 wherein $\Delta$DBP is from about 10 cc/100 g to about 20 cc/100 g.

4. The carbon blacks of claim 1 wherein the ratio of $\Delta$D 50/Dmode is from about 0.70 to about 0.77.

5. The carbon blacks of claim 2 wherein the ratio of $\Delta$D 50/Dmode is from about 0.70 to about 0.77 and $\Delta$DBP is from about 10 cc/100 g to about 20 cc/100 g.

6. The carbon black of claim 1 wherein the nitrogen surface area is about 216 m$^2$/g, the ratio of nitrogen surface area/iodine adsorption number is about 1.00, the ratio of $\Delta$D 50/Dmode is about 0.75, the DBP is about 132 cc/100 g and the $\Delta$DBP is about 20 cc/100 g.

7. The carbon black of claim 1 wherein the nitrogen surface area is about 236 m$^2$/g, the ratio of nitrogen surface area/iodine adsorption number is about 1.00, the ratio of $\Delta$D 50/Dmode is about 0.75, the DBP is about 122 cc/100 g and the $\Delta$DBP is about 16 cc/100 g.

8. The carbon black of claim 1 wherein the nitrogen surface area is about 192 m$^2$/g, the ratio of nitrogen surface area/iodine adsorption number is about 0.96, the ratio of $\Delta$D 50/Dmode is about 0.73, the DBP is about 117 cc/100 g and the $\Delta$DBP is about 15 cc/100 g.

9. A rubber composition comprising about 100 parts, by weight, of a rubber and from about 10 to about 250 parts, by weight, of a carbon black having a nitrogen surface area of at least 180 m$^2$/g to about 250 m$^2$/g, a ratio of nitrogen surface area/iodine adsorption number of from about 0.90 to about 1.05, a ratio of $\Delta$D 50/Dmode of from about 0.67 to about 0.81, a DBP of from about 115 cc/100 g to about 135 cc/100 g and a $\Delta$DBP (DBP-CDBP) less than or equal to 20 cc/100 g.

10. The rubber composition of claim 9 wherein the nitrogen surface area of the carbon blacks is from about 190 m$^2$/g to about 240 m$^2$/g.

11. The rubber composition of claim 9 wherein the $\Delta$DBP of the carbon blacks is from about 10 cc/100 g to about 20 cc/100 g.

12. The rubber composition of claim 9 wherein the ratio of $\Delta$D 50/Dmode of the carbon blacks is from about 0.70 to about 0.77.

13. The rubber composition of claim 10 wherein the ratio of $\Delta$D 50/Dmode of the carbon blacks is from about 0.70 to about 0.77 and $\Delta$DBP of the carbon blacks is from about 10 cc/100 g to about 20 cc/100 g.

14. The rubber composition of claim 9 wherein the nitrogen surface area of the carbon black is about 216 m$^2$/g, the ratio of nitrogen surface area/iodine adsorption number of the carbon black is about 1.00, the ratio of $\Delta$D 50/Dmode of the carbon black is about 0.75, the DBP of the carbon black is about 132 cc/100 g and the $\Delta$DBP of the carbon black is about 20 cc/100 g.

15. The rubber composition of claim 9 wherein the nitrogen surface area of the carbon black is about 236 m$^2$/g, the ratio of nitrogen surface area/iodine adsorption number of the carbon black is about 1.00, the ratio of $\Delta$D 50/Dmode of the carbon black is about 0.75, the DBP of the carbon black is about 122 cc/100 g and the $\Delta$DBP of the carbon black is about 16 cc/100 g.

16. The rubber composition of claim 9 wherein the nitrogen surface area of the carbon black is about 192 m$^2$/g, the ratio of nitrogen surface area/iodine adsorption number of the carbon black is about 0.96, the ratio of $\Delta$D 50/Dmode of the carbon black is about 0.73, the DBP of the carbon black is about 117 cc/100 g and the $\Delta$DBP of the carbon black is about 15 cc/100 g.

17. The rubber composition of claim 9 wherein the rubber is natural rubber.

18. The rubber composition of claim 9 wherein the rubber is synthetic rubber.

19. The rubber composition of claim 9 wherein the carbon black is present in an amount of from about 20 to about 100 parts by weight per 100 parts by weight rubber.

20. The rubber composition of claim 9 wherein the carbon black is present in an amount of from about 40 to about 80 parts by weight per 100 parts by weight rubber.

* * * * *